United States Patent
Debras et al.

(10) Patent No.: US 6,245,869 B1
(45) Date of Patent: Jun. 12, 2001

(54) PRODUCTION OF POLYETHYLENE

(75) Inventors: Guy Debras, Frasnes Lez Gosselies; Philippe Bodart, Clermont-Sous-Huy, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/344,193

(22) Filed: Jun. 24, 1999

(30) Foreign Application Priority Data

Jun. 24, 1998 (EP) .................................................. 98111581

(51) Int. Cl.⁷ ....................................................... C08F 4/24
(52) U.S. Cl. ........................ 526/106; 526/129; 526/169; 502/170; 502/117; 502/256
(58) Field of Search .................................. 526/106, 129, 526/169

(56) References Cited

U.S. PATENT DOCUMENTS

| | | | |
|---|---|---|---|
| 4,564,660 | * 1/1986 | Williams et al. | 526/106 |
| 5,071,927 | 12/1991 | Benham et al. | 526/64 |
| 5,284,926 | 2/1994 | Benham et al. | 526/98 |
| 5,352,658 | 10/1994 | Evertz et al. | 502/107 |
| 5,641,842 | * 6/1997 | McDaniel et al. | 526/96 |
| 6,015,866 | * 1/2000 | Debras et al. | 526/101 |

FOREIGN PATENT DOCUMENTS 0548805   6/1993   (EP) .

* cited by examiner

*Primary Examiner*—David W. Wu
*Assistant Examiner*—R. Rabago
(74) *Attorney, Agent, or Firm*—Jim D. Wheelington

(57) ABSTRACT

A process for producing medium density polyethylene by copolymerizing ethylene and an alpha-olefinic comonomer comprising from 3 to 10 carbon atoms in the presence of a chromium-based catalyst having a support comprising silica and titania, the catalyst being fluorinated and having been chemically reduced by carbon monoxide, and in the presence of a co-catalyst selected from at least one of an aluminum alkyl and a zinc alkyl to produce a polyethylene copolymer having a density of from 0.930 to 0.945 g/cc and a dispersion index (D) of from 9 to 13.

12 Claims, 1 Drawing Sheet

PRODUCTION OF POLYETHYLENE

BACKGROUND OF THE INVENTION

The present invention relates to a process for producing polyethylene, and in particular a process producing medium density polyethylene using a chromium-based catalyst.

Polyethylene is known for use in the manufacture of a wide variety of articles. The polyethylene polymerisation process can be varied in a number of respects to produce a wide variety of resultant polyethylene resins having different physical properties which render the various resins suitable for use in different applications. Medium density polyethylene resins are known for use in making films. Such medium density films are known to have good resin processability due to the presence of long chain branching in the polyethylene polymer molecules. It is known to produce such resins using chromium-based catalysts, which have been known for some time. Unfortunately, some medium density resins produced by such catalysts suffer from the problem that when the film is to be used for the packaging of foods for human consumption, it is required that the level of extractable or volatile compounds in the polyethylene resin is low so that the food is not inadvertently contaminated. For example, in the United States the Food and Drug Administration has set maximum limits for the amount of extractable or volatile compounds in polyethylene resins for food applications.

It is also known to produce polyethylene using metallocene catalysts, typically unbridged metallocene catalysts. Such catalysts are known to produce polyethylene resin films having low values of extractable components due to the narrow molecular weight distribution in the polyethylene resin, which yields a very low proportion of components in the resin at low molecular weight. Unfortunately, such films suffer from the technical problem that the combination of narrow molecular weight distribution and the absence of long chain branching are responsible for the resins having poor processability.

U.S. Pat. No. 5,284,926 discloses an ethylene polymerisation catalyst system and process. It is disclosed that the catalyst may be a chromium-based catalyst which may be subjected to fluorination and subsequent reduction by carbon monoxide. The polymerization process may be carried out in the presence of a trialkyl aluminium co-catalyst. However, there is no disclosure of the production of medium density polyethylene resins, or in particular the production of such resins suitable for food packaging having a low level of extractable or volatile compounds in the resin.

U.S. Pat. No. 5,352,658 discloses a similar catalyst system and polymerization process. This specification addresses the problem of providing excellent low temperature impact strength and preventing swelling in the blow moulding process on emergence from the extruder die. The specification does not address the problem of the production of medium density polyethylene films having suitability for food packaging by having low levels of extractable or volatile compounds.

EP-A-0548805 discloses polymerization catalysts and processes for the production of high density polyethylene homopolymers. There is no disclosure of the production of medium density polyethylene resins suitable for use in making film packaging for food.

U.S. Pat. No. 5,071,927 discloses high-temperature slurry polymerization of ethylene using a chromium-based catalyst and a trialkyl boron or polyalkyl silane co-catalyst. Although the production of a medium density polyethylene resin is disclosed, there is no disclosure of such a resin having low levels of extractable or volatile compounds to render the resin suitable for food packaging.

SUMMARY OF THE INVENTION

The present invention aims to provide a process which at least partially overcomes these problems of the prior art.

Accordingly, the present invention provides a process for producing medium density polyethylene by copolymerising ethylene and an alpha-olefinic comonomer comprising from 3 to 10 carbon atoms in the presence of a chromium-based catalyst having a support comprising silica and titania, the catalyst being fluorinated and having been chemically reduced by carbon monoxide, and in the presence of a co-catalyst selected from at least one of an aluminium alkyl and a zinc alkyl to produce a polyethylene copolymer having a density of from 0.930 to 0.945 g/cc and a dispersion index (D) of from 9 to 13.

The present invention further provides the use for reducing the fraction of low molecular weight volatile compounds of a medium density polyethylene having a density of from 0.930 to 0.945 g/cc, of a chromium-based catalyst, having a silica and titania support and which is fluorinated and has been chemically reduced by carbon monoxide, together with at least one of an aluminium alkyl and a zinc alkyl co-catalyst in a process for copolymerising ethylene and an alpha-olefinic comonomer comprising from 3 to 10 carbon atoms.

The present invention is predicated on the surprising discovery by the present inventor that by treating a particular chromium-based catalyst with fluorine and chemically reducing the catalyst with carbon monoxide, and by using a particular co-catalyst it is possible strongly to reduce the level of extractable or volatile compounds of a medium density polyethylene resin without reducing the processability of the catalyst. The chromium-based catalyst continues to provide processability due to the presence of long chain branching in the polyethylene resin. Such a resin having a low level of extractable or volatile compounds may be used to produce food packaging, e.g. as films.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
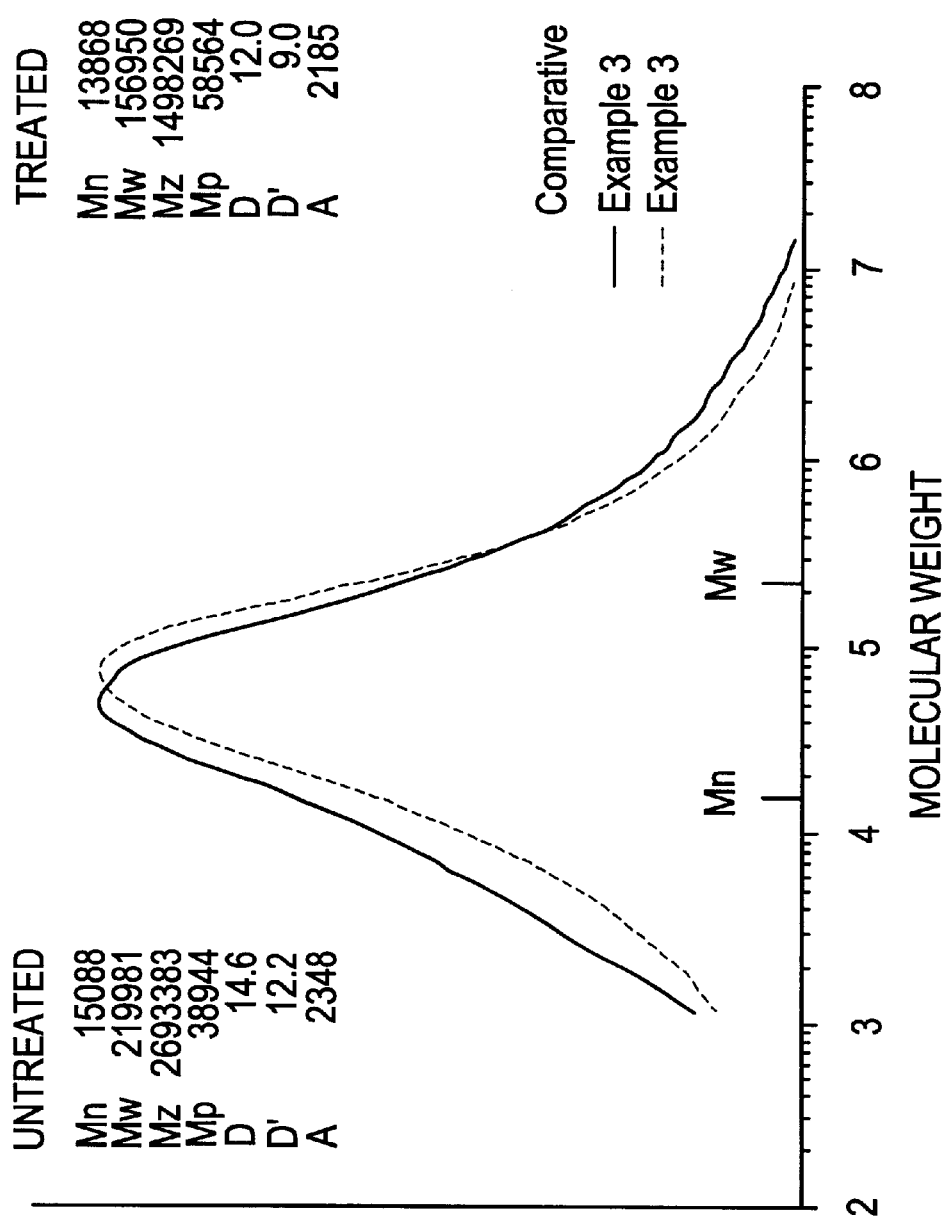
FIG. 1 shows the molecular weight distributions of polyethylene resins produced in accordance with an Example of the present invention and a Comparative Example.

The chromium-based catalyst preferably comprises a supported chromium oxide catalyst having a silica and titania-containing support. A particularly preferred chromium-based catalyst may comprise from 0.5 to 5 wt % chromium, preferably around 1 wt % chromium, based on the weight of the chromium-based catalyst. The titania may be present in an amount to provide from 1 to 5 wt % titanium, preferably from 2 to 3 wt % titanium in the catalyst. The support may have a specific surface area of from 200 to 700 m$^2$/g, preferably from 400 to 550 m$^2$/g and a volume porosity of greater than 2 cc/g, preferably from 2 to 3 cc/g. The average pore radius is preferably greater than 100A, more preferably from 100 to 1000A and most preferably from 150 to 250A.

A particularly preferred chromium-based catalyst for use in the present invention comprises a catalyst having a specific surface area of around 510 m²/g, an average pore radius of 190A, a pore volume of around 2.1 cc/g in a support comprising silica and titania, and a chromium content of around 0.9 wt % based on the weight of the chromium-containing catalyst. The support contains titania in an amount to provide around 2.3 wt % titanium in the catalyst. In the process of the present invention, the catalyst is activated in air at an elevated activation temperature. The activation temperature preferably ranges from 500 to 850° C., more preferably from 600 to 750° C., and is most particularly around 650° C. In one embodiment, following the activation of the catalyst, the catalyst is subjected to a fluorination process in order to introduce fluorine into the catalyst. For example, the chromium-based catalyst may be premixed with a fluorine-containing compound such ammonium boron tetrafluoride ($NH_4BF_4$) in solid form, and then heated in air at elevated temperature, for example at a temperature of from 500 to 850° C. so as to react together the catalyst and the fluorine-containing compound. Typically, from 0.2 to 2 wt % fluorine, most typically around 1 wt % fluorine, based on the weight of the chromium-based catalyst, is introduced into the catalyst. In other embodiments, the fluorination step is performed before or during the activation step. Furthermore, in a further embodiment, the catalyst may be a commercially available fluorine-containing chromium-based catalyst.

The fluorinated and activated catalyst is then subjected to a chemical reduction step employing dry carbon monoxide. The reduction step is preferably carried out at a temperature of from 300 to 500° C., most particularly around 370° C. Typically, the carbon monoxide is present in an inert gas such as nitrogen. Most typically, the carbon monoxide is present in an amount of around 8 vol % CO in nitrogen gas. The carbon monoxide reduction step is typically carried out for a period of from 5 to 120 minutes. Most typically, the carbon monoxide reduction step is carried out for a period of around 30 minutes at a temperature of 370° C. Following the carbon monoxide reduction step, the catalyst is flushed with air or the inert gas such as nitrogen at elevated temperature, typically at a temperature of around 250° C. for a period of around 1 hour.

The so-treated catalyst is then employed in a process for producing polyethylene resins in accordance with the present invention. The process comprises polyethylene copolymerization which is carried out in the liquid phase comprising ethylene and an alpha-olefinic copolymer comprising from 3 to 10 carbon atoms, in an inert diluent. The comonomer may be selected from 1-butene, 1-pentene, 1-hexene, 4-methyl 1-pentene, 1-heptene, 1-octene, 1-nonene and 1-decene. The inert diluent is preferably isobutane. The copolymerization process is typically carried out at a temperature of from 80 to 110° C., more preferably from 90 to 100° C., and at a pressure of from 20 to 42 bar, more preferably at a minimum pressure of 24 bar.

Typically, in the copolymerization process, the ethylene monomer comprises from 0.5 to 8% by weight and the comonomer comprises up to 4% by weight, each based on the weight of the inert diluent.

Hydrogen may also be introduced into the polymerization reactor, preferably in an amount of from 0.01 to 1 vol %.

The copolymerization process is additionally carried out in the presence of an aluminium alkyl and/or zinc alkyl co-catalyst for example triethyl aluminium (TEAL), or diethyl zinc (DEZ). The co-catalyst preferably is in an amount of up to 5 ppm by weight, more preferably up to 2 ppm by weight, based on the weight of the inert diluent.

The chromium-based catalyst is introduced together with the co-catalyst into the polymerization reactor. The ethylene monomer and comonomer and optionally hydrogen are fed into the polymerization reactor and the polymerization product of medium density polyethylene copolymer is discharged from the reactor and separated from the diluent which can then be recycled. The medium density polyethylene produced in accordance with the invention has a density of from 0.930 to 0.945 g/cc.

The process of the present invention can provide medium density polyethylene resins having a low shear response SR "i.e., from 60 to 90," after the phrase "low shear response SR" and a low dispersion index (D). The low dispersion index is indicative of a narrow molecular weight distribution, in turn indicating a low amount of volatile compounds at the lower end of the molecular weight distribution. Although the shear response is relatively low, the ratio of the shear response and the dispersion index for polymers produced in accordance with the invention "i.e., from 5 to 6.5" is about the same as for known polymers, for example produced using a chromium-based catalyst which has not been fluorinated or subjected to carbon monoxide production as in accordance with the invention. This indicates that the processability of the resins produced in accordance with the invention is substantially the same as for resins produced using such a known process.

It is believed that the use of fluorination and carbon monoxide reduction of the catalyst enhances the comonomer incorporation into the polyethylene resin, particularly at the high molecular weight end of the molecular weight distribution. This reduces the cost of the production of the polyethylene resin because this enables a reduced amount of comonomer to require to be introduced into the polymerization reactor. Moreover, the process of the invention results in a relatively uniform incorporation of the comonomer into the polyethylene resin, yielding a relatively low comonomer/ethylene ratio in the resultant resin for achieving a given density in the medium density polyethylene resin. The molecular weight distribution of polyethylene resins produced in accordance with the invention is relatively narrow, as represented by a small dispersion index D, and as a result of the narrow molecular weight distribution, for any given density of the resin, there is a lower amount of in situ comonomer incorporation. The use of the aluminium and/or zinc alkyl co-catalyst tends to increase the amount of in situ comonomer production in the process, thereby also requiring less comonomer to be introduced into the reactor in order to reach a given density for the polyethylene resin. The combined use of fluorination and Co reduction of the catalyst tends to depress the melt index of the catalyst, and in the polymerization reactor hydrogen is additionally introduced into the polymerization reactor, typically in an amount up to about 1 volume % in order to increase the melt index so as substantially to correspond to the value obtainable absent fluorination of the catalyst.

The present invention will now be described with reference to the following non-limiting Examples.

EXAMPLE 1

In Example 1, a polyethylene resin was produced by a copolymerization process in which a fluorinated and carbon monoxide-reduced chromium-based catalyst was employed. The comonomer comprised 1-hexene and the diluent comprised isobutane.

The chromium-based catalyst had a specific surface area of around 510 m²/g, an average pore radius of 190A, a pore volume of around 2.1 cc/g, and a chromium content of around 0.9 wt % based on the weight of the chromium-based catalyst. The support comprised a silica and titania support, the titania providing around 2.3 wt % titanium in the catalyst. The catalyst was activated in air at a temperature of around 650° C. and thereafter the activated catalyst was fluorinated by introducing $NH_4BF_4$ onto the catalyst after the activation step.

After the fluorination step, the catalyst was subjected to a carbon monoxide reduction step by treating the catalyst with a flow of 8 vol % carbon monoxide in nitrogen at a temperature of 370° C. for 30 minutes followed by flushing with nitrogen at a temperature of 250° C. for 1 hour.

The fluorinated catalyst comprised 1 wt % fluorine.

The catalyst then used together with triethyl aluminium (TEAL) as a co-catalyst in an amount of around 1 ppm based on the weight of the diluent, in the polymerization conditions specified in Table 1, wherein the amounts of ethylene monomer, 1-hexene comonomer, and hydrogen are specified. The polymerization was carried out at a temperature of 95° C. at a pressure of 40 bars. Table 1 also indicates the 1-hexene/ethylene molar ratio in the resultant resin.

Thereafter, the resultant resin was tested to determine the characteristics of the polymer. The melt index ($MI_2$) and the high load melt index (HLMI) were measured, and the shear response (SR) was thereafter calculated being the ratio of the $HLMI/MI_2$. The melt index $MI_2$ and the high load melt index HLMI were measured using the procedures of ASTM D 1238 using respective loads of 2.16 kg and 21.6 kg at a temperature of 190° C. The density of the resin was also measured. The resin was subjected to gel phase chromatography which yielded a graph having a curve representing the molecular weight distribution and also a computation of the average molecular weight by number (Mn); the average molecular weight by weight (Mw); and the dispersion index D representing the ratio Mw/Mn. These values are specified in Table 1. The ratio of the shear response SR and the dispersion index D was calculated. This ratio is also specified in Table 1.

It may be seen that the polyethylene resin produced in accordance with Example 1 had a shear response SR of 62 which is relatively low, and a dispersion index D of around 10.3 which is also low. The low value of the dispersion index is representative of a narrow molecular weight distribution, which in turn indicates a reduced amount of volatile or extractable compounds present at the low molecular weight end of the molecular weight distribution. The ratio SR/D was 6.0.

EXAMPLE 2

For Example 2, Example 1 was repeated using the same catalyst and the same polymerization temperature and pressure, except that the amounts of ethylene monomer and hydrogen in the polymerization reactor were varied, being the amounts specified in Table 1. It will be seen that the ratio of the 1-hexene comonomer and the ethylene monomer which are present in the resultant resin are the same for Examples 1 and 2 i.e. 2.2. The polymer characteristics for the resin produced in accordance with Example 2 were also measured and are shown in Table 1.

It may be seen that the resin of Example 2 had a shear response SR of 60 and a dispersion index D of 11.1. Again, this indicates a narrow molecular weight distribution, in turn indicative of a low amount of volatile or extractable compounds at the low molecular weight end of the molecular weight distribution. The ratio of the shear response and the dispersion index was 5.4, being substantially the same as that for Example 1.

COMPARATIVE EXAMPLES 1 and 2

In Comparative Examples 1 and 2, the same chromium-based catalyst as for Examples 1 and 2, but which had been activated at a temperature of 635° C. and had not been subjected to the fluorination and CO reduction processes in accordance with the present invention, was employed in polyethylene polymerization processes in the presence of the same amount of TEAL co-catalyst as in Examples 1 and 2. The polymerization conditions are also specified in Table 1, as are the characteristics of the resultant polymers, for Comparative Examples 1 and 2.

It may be seen that when a chromium-based catalyst which had not been subjected to fluorination and carbon monoxide reduction was employed in the preparation of the catalyst, the resultant medium density polyethylene resin had a higher shear response SR and a high dispersion index D than for the resins produced in accordance with the present invention. The higher dispersion index D indicates a broader molecular weight distribution, which in turn is indicative of increased content of volatile or extractable components at the low molecular weight end of the molecular weight distribution.

The ratio between the shear response and the dispersion index for the resins produced in accordance with Comparative Examples 1 and 2 is substantially the same as that for Examples 1 and 2 of the present invention, indicating that for both the Examples and the Comparative Examples, the resins have substantially the same degree of long chain branching and substantially the same processability. Accordingly, the present invention can, as compared to the prior art processes using a chromium-based catalyst which has not been subjected to fluorination and CO reduction steps in its preparation, yield polyethylene resins of medium density having substantially the same processability, but reduced volatile or extractable content, than resins using the known chromium-based catalysts.

It may also be seen from Table 1 that since fluorination and carbon monoxide reduction are not employed in Comparative Examples 1 and 2, thereby tending to reduce the comonomer incorporation into the polyethylene resin, the amount of comonomer required to be present in the polymerization reactor is significantly higher than that for Examples 1 and 2. This increases the cost of the production process. For Comparative Examples 1 and 2, the ratio of the 1-hexene comonomer and ethylene monomer actually incorporated into the resin is around 0.54, which is significantly higher than the corresponding value of 0.22 for Examples 1 and 2. This indicates that in the process of the present invention, there is a different mechanism for the incorporation of the comonomer in the resin, which yields a more uniform comonomer distribution for any given density. In other words, for achieving a given density for the polyethylene resin, the polyethylene resins of the present invention require a reduced comonomer amount as a result of increased uniformity of the comonomer distribution.

EXAMPLE 3 and COMPARATIVE EXAMPLE 3

In Example 3 and Comparative Example 3, the same chromium-based catalyst as for the previous Examples and Comparative Examples was employed to produce a medium density polyethylene resin. In Example 3, the chromium-based catalyst was subjected to fluorination and CO reduction as for Examples 1 and 2 and for Comparative Example 3 the catalyst was not subjected to such pre-treatment steps. The activation temperature was 650° C. The fluorination conditions and the carbon monoxide reduction conditions were substantially the same as those for Examples 1 and 2. For Example 3 the polymerization conditions comprised $C_2$ 5.4 wt %, $C_6$ 2.0 wt %, $H_2$ 0 vol %, $C_6/C_2$ 0.37 wt %, temperature 93° C. and pressure 42 bar and for Comparative Example 3, the polymerization conditions comprised $C_2$ 5.4 wt %, $C_6$ 2.8 wt %, $H_2$ 0.4 vol %, $C_6/C_2$ 0.5 wt %, temperature 90° C. and pressure 42 bar.

The resultant polyethylene resins were subjected to gel phase chromatography and the gel phase chromatographs for the resins of both Example 3 and Comparative Example 3 are illustrated in FIG. 1. It may be seen that for the resin of Example 3, the amount of lower molecular weight polymers at the lower molecular weight end of the molecular weight distribution is lower than that for Comparative Example 3, indicating a reduced amount of volatile or extractable components for the resin of Example 3. It may also be seen that the molecular weight distribution of the resin of Example 3 has a narrower molecular weight distribution, as represented by the dispersion index D, than that for Comparative Example 3.

EXAMPLES 4 and 5 and COMPARATIVE EXAMPLES 4 and 5

In Examples 4 and 5 polyethylene resins were produced using the catalyst of Example 1 which had been fluorinated with ammonium boron tetrafluoride ($NH_4BF_4$) giving an amount of 1 wt % fluorine in the catalyst and thereafter the catalyst was activated at a temperature of 650° C. and reduced with carbon monoxide at a temperature of 370° C. for a period of around 30 minutes. Two medium density polyethylene resins were obtained each having an HLMI lying within the range of from 14 to 18 g/10 min and a density lying with the range of from 0.934 to 0.935 g/cc. Those resins were then treated in hexane under reflux in a Soxhlet apparatus to extract low molecular weight components from the resins and in particular specific waxes. The resin of Example 4 yielded a wax content of 1.4 wt % and the resin of Example 5 yielded a wax content of 4.5 wt %.

In Comparative Examples 4 and 5, the same catalyst which had been activated at 635° C. but had not been subject to a fluorination and CO reduction step was employed to produce medium density polyethylene resins having an HLMI falling within the range of from 17 to 23 g/10 min and a density falling within the range of from 0.934 to 0.937 g/cc. Again, those resins were treated in hexane under reflux as for Examples 4 and 5 to extract the low molecular weight components and in particular specified waxes. The resins of Comparative Examples 4 and 5 had respective wax contents of 4.7 wt % and 7.4 wt %.

The foregoing data shows that the resins formed in accordance with the Examples of the invention tend to contain less wax than the resins of the Comparative Examples in which the same catalyst was not subjected to a fluorination step and a carbon monoxide reduction step in accordance with the present invention.

TABLE 1

| CATALYST | Example 1 | Example 2 | Comparative Example 1 | Comparative Example 2 |
|---|---|---|---|---|
| Activation temperature | 650 | 650 | 635 | 635 |
| Fluorination | Yes 1% | Yes 1% | No | No |
| CO reduction temperature | 370 | 370 | No | No |
| TEAL (ppm) | 1.0 | 1.0 | 1.0 | 1.0 |
| Polymerisation conditions | | | | |
| $C_2$ (wt %) | 5.8 | 5.1 | 5.6 | 5.4 |
| $C_6$ (wt %) | 1.1 | 1.1 | 3.0 | 2.9 |
| $H_2$ (vol %) | 0.19 | 0.05 | 0 | 0.07 |
| $C_6/C_2$ | 0.22 | 0.22 | 0.54 | 0.54 |
| Polymer characteristics | | | | |
| $MI_2$ (g/100) | 0.22 | 0.33 | 0.21 | 0.23 |
| HLMI (g/100) | 13.5 | 19.9 | 17.6 | 20.2 |
| SR | 62 | 60 | 86 | 87 |
| density | 0.933 | 0.931 | 0.933 | 0.931 |
| Mn (kDa) | 18.2 | 16.8 | 13.3 | 13.8 |
| Mw (kDa) | 187 | 185 | 206 | 207 |
| D | 10.3 | 11.1 | 15.5 | 15.0 |
| SR/D | 6.0 | 5.4 | 5.5 | 6.1 |

What is claimed is:

1. A process for producing medium density polyethylene by copolymerising ethylene and an alpha-olefinic comonomer comprising from 3 to 10 carbon atoms in the presence of a chromium-based catalyst having a support comprising silica and titania, the catalyst being fluorinated and having been chemically reduced by carbon monoxide, and in the presence of a co-catalyst selected from at least one of an aluminium alkyl and a zinc alkyl to produce a polyethylene copolymer having a density of from 0.930 to 0.945 g/cc and a dispersion index (D) of from 9 to 13.

2. A process according to claim 1 wherein the catalyst has been fluorinated by mixing the chromium-based catalyst with a fluorine-containing compound and heating the mixture at elevated temperature.

3. A process according to claim 1 wherein the fluorine-containing compound comprises $NH_4BF_4$.

4. A process according to claim 1 wherein the fluorinated chromium-based catalyst comprises around 1 wt % fluorine based on the weight of the catalyst.

5. A process according to claim 1 wherein the catalyst is chemically reduced by carbon monoxide at a temperature of from 300 to 500° C.

6. A process according to claim 5 wherein the chromium based catalyst has been reduced by carbon monoxide at a temperature of around 370° C.

7. A process according to claim 1 wherein the catalyst has been chemically reduced by carbon monoxide by passing carbon monoxide in an inert gas over the fluorinated chromium-based catalyst.

8. A process according to claim 1 wherein the co-catalyst is in an amount of up to 5 ppm by weight based on the amount of diluent for the ethylene and the comonomer.

9. A process according to claim 8 wherein the co-catalyst is in an amount of up to 2 ppm by weight based on the amount of diluent for the ethylene and the comonomer.

10. A process according to claim 1 wherein the medium density polyethylene has a shear response (SR) of from 60 to 90.

11. A process according to claim 1 wherein the medium density polyethylene has a ratio of the shear response (SR) to the dispersion index (D) of from 5 to 6.5.

12. A process for copolymerising ethylene and an alpha-olefinic comonomer comprising from 3 to 10 carbon atoms to produce a medium density polyethylene having a density of from 0.930 to 0.945 g/c wherein for reducing the fraction of low molecular weight volatile compounds of the medium density polyethylene the copolymerization is in the presence of a chromium-based catalyst, having a silica and titania support and which is fluorinated and has been chemically reduced by carbon monoxide, together with at least one of an aluminium alkyl and a zinc alkyl co-catalyst.

* * * * *